US012681130B1

(12) United States Patent
Batten

(10) Patent No.: US 12,681,130 B1
(45) Date of Patent: Jul. 14, 2026

(54) LIMITED ANCHOR BEACON SET FOR LOCAL LOCATION DETERMINATION ON PORTABLE COMMUNICATION DEVICES

(71) Applicant: Relay, Inc., Raleigh, NC (US)

(72) Inventor: Dayne Batten, Cary, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/386,371

(22) Filed: Nov. 12, 2025

(51) Int. Cl.
*G01S 5/02* (2010.01)
*H04W 64/00* (2009.01)

(52) U.S. Cl.
CPC ........ *G01S 5/0284* (2013.01); *G01S 5/02521* (2020.05); *H04W 64/00* (2013.01)

(58) Field of Classification Search
CPC .. G01S 5/0284; G01S 5/02521; G01S 5/0236; G01S 5/14; G01S 5/0036; G01S 5/0072; G01S 5/0252; G01S 5/021; G01S 5/0289; G01S 13/765; G01S 5/0242; G01S 5/10; H04W 64/00; H04W 4/029; H04W 4/02; H04W 4/023; H04W 4/021; H04W 64/003; H04W 4/33; H04W 84/12; H04W 4/80; H04W 4/025; H04W 24/08; H04W 64/006; H04W 24/10; H04W 84/18; H04W 88/08; H04W 4/027; H04W 8/005; H04W 4/90; H04W 4/026; H04W 48/16; H04W 4/38; H04W 4/024; H04W 16/18; H04W 24/02; H04W 4/30; H04W 88/02;

H04W 48/08; H04W 12/63; H04W 56/0015; H04W 12/104; G01C 21/206; G01C 21/20; G01C 21/005; G01C 21/12; G01C 21/383
See application file for complete search history.

(56) References Cited

U.S. PATENT DOCUMENTS

| | | | |
|---|---|---|---|
| 2015/0181552 A1* | 6/2015 | Bajko | .................. H04W 64/00 |
| | | | 455/456.2 |
| 2016/0066151 A1* | 3/2016 | Palanki | ................ H04W 4/025 |
| | | | 455/456.1 |
| 2025/0267624 A1* | 8/2025 | Reddy | ..................... H04B 7/04 |

* cited by examiner

*Primary Examiner* — Jing Gao
(74) *Attorney, Agent, or Firm* — Gregory Stephens

(57) ABSTRACT

In an example, a method includes obtaining, using a set of one or more processors, location information relating a sparse set of anchor beacons to respective locations within an environment; incorporating, by the set of one or more processors, the location information relating the sparse set of anchor beacons to respective locations within the environment into an environment dataset comprising a dense set of point data obtained via one or more portable communication device (PCD), wherein each point data has a position and respective wireless signal data at that position within the environment; and configuring a first PCD to use the environment dataset for a local location determination process based on a comparison of newly obtained wireless signal data from one or more wireless access points in the environment to the environment dataset.

18 Claims, 5 Drawing Sheets

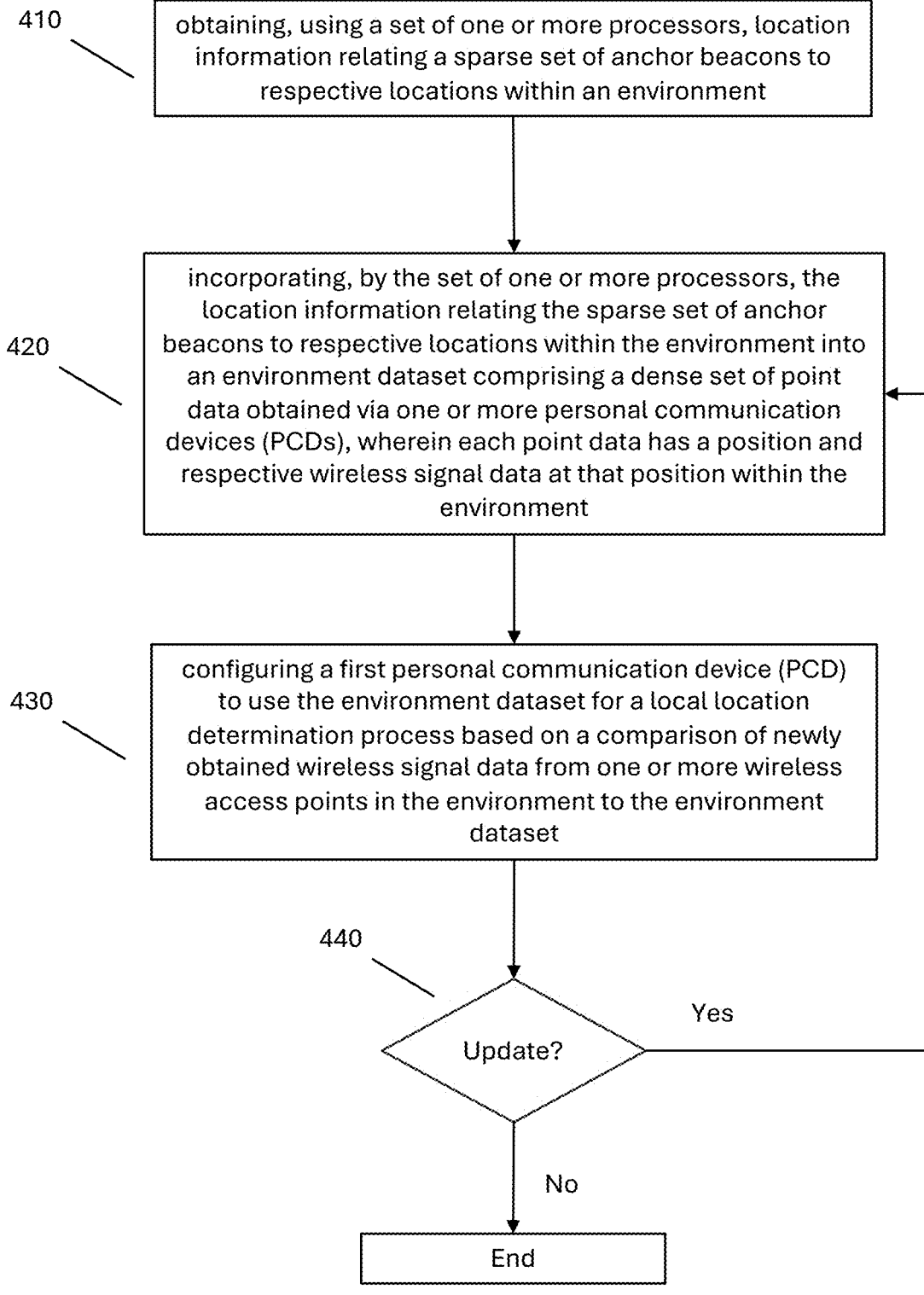

410 — obtaining, using a set of one or more processors, location information relating a sparse set of anchor beacons to respective locations within an environment 420 — incorporating, by the set of one or more processors, the location information relating the sparse set of anchor beacons to respective locations within the environment into an environment dataset comprising a dense set of point data obtained via one or more personal communication devices (PCDs), wherein each point data has a position and respective wireless signal data at that position within the environment 430 — configuring a first personal communication device (PCD) to use the environment dataset for a local location determination process based on a comparison of newly obtained wireless signal data from one or more wireless access points in the environment to the environment dataset 440 — Update?

Yes

No

End

FIG. 4

LIMITED ANCHOR BEACON SET FOR LOCAL LOCATION DETERMINATION ON PORTABLE COMMUNICATION DEVICES

BACKGROUND

1. Field

The disclosed subject matter generally pertains to location determination for portable communication devices (PCDs). Certain subject matter pertains to local location determinations made on a PCD.

2. Description of the Related Art

In many voice and data communication contexts, such as in an enterprise setting, it is not desirable to have users operate a smartphone, whether a personal smartphone or a company-supplied smartphone. Among considerations impacting a decision not to use a smartphone are potential distractions which may impact workplace safety and the requirement to manage access to secure data.

The Relay® device by Relay, Inc. is a handheld portable communication device (PCD) that provides voice communication with other Relay® devices, similar to a walkie-talkie. One embodiment of a Relay device uses a voice interface while other embodiments may include a limited small screen primarily used to convey device diagnostic information such as, for instance, battery status, signal strength, channel information, time, etc. The Relay® device can use a wireless Internet Protocol (IP) communication link rather than a circuit switched communication link to exchange voice messages and data with a communication platform server (CPS). The CPS manages voice messages and data among various endpoints. The communication device(s) may wirelessly connect to an IP network over one or more wireless IP interfaces and communication links. The IP communication link may use one or more of the Wi-Fi channels and protocols, such as the 802.11 family, or may use one of the many cellular IP air interfaces and over-the-air (OTA) RF protocols.

SUMMARY

Conventional location determination, particularly for indoor environments, relies on a location beacon system, where the position of a beacon is known in advance and signals from one or more beacons are received on a portable communication device (PCD) and used to determine a location. When there is no location beacon system in an indoor environment, a precise location is hard to determine, often necessitating use of other techniques such as triangulation from cell towers with poor received signal strength.

An embodiment provides a location determination process for mapping and precomputing a dataset for use locally by a PCD in an environment, such as inside a building or warehouse or other defined space (indoor or outdoor), which is only equipped with a sparse set of anchor beacons, i.e., providing only partial coverage of the environment, such as 3-4 beacons per floor of a building. A location determination dataset, referred to as an environment dataset, may be formed from a scanning and data collection technique, for example facilitated by PCDs collecting relative wireless access point data from the environment. The dense set of wireless access point data collected is related to real world data, e.g., map data, using the sparse set of anchor beacons, producing an environment dataset for use by the PCD locally. An embodiment therefore permits a PCD to reference the environment dataset and determine its location within the environment without the requirement to have the PCD contact a remote or cloud server to provide computation resources.

In summary, an embodiment provides a method, comprising: obtaining, using a set of one or more processors, location information relating a sparse set of anchor beacons to respective locations within a environment; incorporating, by the set of one or more processors, the location information relating the sparse set of anchor beacons to respective locations within the environment into an environment dataset comprising a dense set of point data obtained via one or more portable communication device (PCD), wherein each point data has a position and respective wireless signal data at that position within the environment; and configuring a first PCD to use the environment dataset for a local location determination process based on a comparison of newly obtained wireless signal data from one or more wireless access points in the environment to the environment dataset.

In an embodiment, the sparse set of anchor beacons associates respective ones of the point data to a known location in a map of the environment. In an embodiment, the map of the environment comprises fixed features and their respective relationships. In an embodiment, the sparse set of anchor beacons provides partial coverage of the environment. In an embodiment, a gap in the partial coverage is filled via the dense set of point data. In an embodiment, position and number of the sparse set of anchor beacons are based on a shape of the environment. In an embodiment, the environment is an indoor environment.

In an embodiment, a method includes receiving at a communication platform server (CPS) the newly obtained wireless signal data from one or more wireless access points in the environment; and updating the environment dataset based at least in part on the newly obtained wireless signal data. In an embodiment, the updating comprises: identifying a new wireless access point; and providing new point data comprising a position and wireless signal data for the new wireless access point in an updated environment dataset.

In an embodiment, a method comprises deploying the set of anchor beacons within the environment.

In an embodiment, the configuring comprises providing the environment dataset to the first PCD.

In another aspect, a computer system includes one or more processors, a non-transitory computer readable storage medium or device, and one or more programs stored in the non-transitory computer readable storage medium or device. The one or more programs comprise code that is configured for execution by the one or more processors. The one or more programs include instructions for performing any of the methods, or parts thereof, as described herein.

In another aspect, a non-transitory computer readable storage medium or device stores one or more programs having code configured for execution by one or more processors of a computer system. The one or more programs include instructions for performing any of the methods, or parts thereof, as described herein.

The foregoing is a summary and thus may contain simplifications, generalizations, and omissions of detail; consequently, those skilled in the art will appreciate that the summary is illustrative only and is not intended to be in any way limiting.

These and other features and characteristics of the example embodiments, as well as the methods of operation and functions of the related elements of structure and the combination thereof, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of a claimed invention.

BRIEF DESCRIPTION OF THE DRAWINGS

FIG. 4 illustrates an example method according to an embodiment.

DETAILED DESCRIPTION OF EXAMPLE EMBODIMENTS

Figure 1:
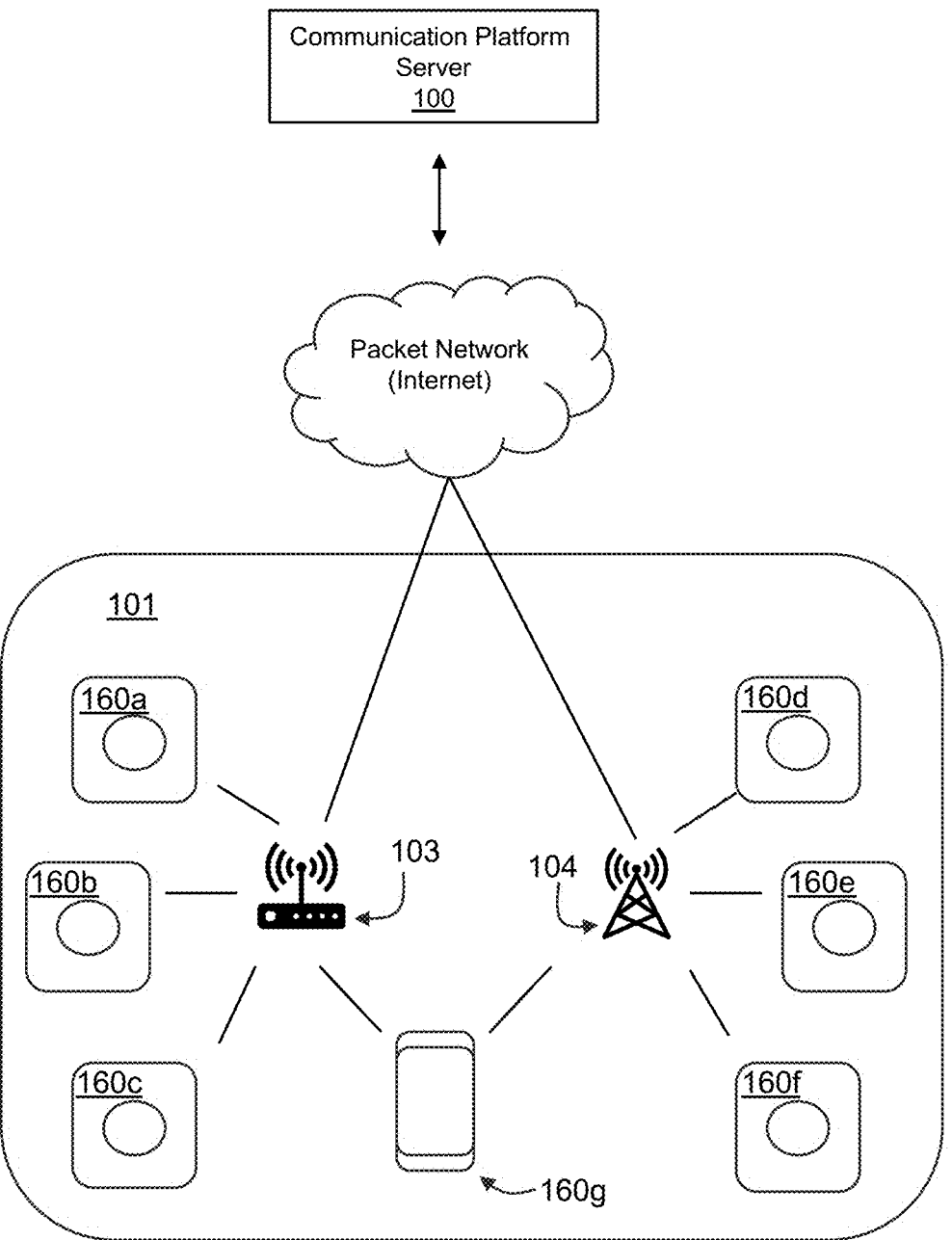
FIG. 1 illustrates a diagram of example system components according to an embodiment.

The described features, structures, or characteristics of the example embodiments may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

One example of a portable communication device (PCD) is the Relay® device offered by Relay, Inc. Such devices find use in, for example, facilitating voice communication among users keeping a respective PCD on their person. In a non-limiting example, a PCD provides a push-to-talk functionality, like conventional walkie-talkies for radio communications. PCDs require sophisticated communication capabilities, including customized, secure, and/or personal logical communication channels, for example a voice channel only connecting members of a given team.

In some environments, for example inside an environment such as a building, a dense system of dedicated location beacons may provide coverage for an environment, supplying signals that are used to locate a PCD by direct RF communication with a proximate beacon. Without a dense set of beacons, the inability to determine a precise location can be detrimental in certain circumstances, for example during an emergency.

In many cases, location services reliant on a dense set of beacons is not compatible with minimal cost, setup, and maintenance effort. For example, a dense set of beacons may require installing hundreds of beacons or carefully mapping an environment to produce a fingerprint of wireless access points within the environment. What is needed is a way to learn the spatial relationships between the existing radio frequency (RF) sources (such as the 802.11 family of Wi-Fi® access points, Bluetooth® devices, etc., collectively referred to herein as "wireless access points") in an environment such as a building with little customer beacon installation or dedicated mapping needed. It should be noted that use of trademarked names such as Bluetooth® and Wi-Fi® is merely to describe the relevant technologies they represent. In this case, each represents a ubiquitous wireless communication protocol that is standardized and well known in the industry.

Conventionally it has been possible to learn spatial relationships of wireless access points on a relative level, but it is more challenging to anchor the relative locations to the real world. Knowing where wireless access points are in the real world requires either getting a human to label some of the data or getting quality global positioning system (GPS) readings around the environment such as a building. However, many customers may not be interested in or capable of doing the labeling work, and there is no guarantee of a quality GPS reading. Further, the RF environment or wireless access point fingerprint of a given environment such as a building is subject to change. For example, if one or more wireless access points are moved or modified, suddenly all prior data relating thereto is useless. Thus, it may not be easy to recreate a wireless access point fingerprint for the environment, requiring a remapping or waiting for new GPS readings, etc.

An embodiment overcomes these challenges by leveraging location information relating a sparse set of anchor beacons that provide information on respective locations within an environment. This information is incorporated into an environment dataset comprising a dense set of point data obtained via one or more PCDs, e.g., related to wireless access point locations. For example, each point data is associated with a position and respective wireless signal data at that position within the environment. The combined information related to fixed, known, real-world locations of the sparse set of anchor beacons and the dense set of point data allows for configuring a PCD to use the environment dataset for a local location determination. A local location determination process may be performed by the PCD offline, for example, based on a comparison of newly obtained wireless access point data from one or more wireless access points in the environment to the environment dataset. This permits a PCD to locate itself within the environment, even when out of range of a beacon of the sparse set of anchor beacons, i.e., in an area with a gap in coverage with respect to anchor beacon wireless coverage.

An embodiment may provide a sparse set of anchor beacons (e.g., as low as 3-4) comprising, for example, standard Bluetooth Low Energy (BLE) location beacons, that are distributed as anchors at known locations in the environment. For example, a warehouse customer might put one beacon at each of the four corners of a warehouse and input the locations of those four beacons into a graphical user interface that collects map data that may be stored on a communication platform server (CPS).

An embodiment then gathers a dense set of point data, e.g., Bluetooth and Wi-Fi wireless access point data from PCDs during normal use in the environment. This data, for example, could be sent to the CPS and saved. Using a variety of models, an embodiment learns the relative spatial relationships between and among the wireless access point data sources in the building. Because an embodiment has access to the known locations of the anchor beacons, and these are included in the environment dataset, an embodiment can accurately associate all the point data with real-world physical positions, e.g., locations on a map representing the environment, such as a floor plan.

An embodiment may then use calculated positions of all the wireless access point data sources for positioning PCDs in the environment. If the environment changes in terms of wireless access point data footprint, e.g., a customer changes their RF environment (e.g., upgrades the Wi-Fi in the environment), an embodiment can seamlessly re-bootstrap the environment location model using the known locations of the anchor beacons, preventing the need to re-map the environment.

An embodiment therefore provides an environment dataset, provided to and stored on a PCD, that can be used to precisely locate the PCD in the environment using only computation on the PCD and without connectivity to an external network. An environment dataset may be based on a sparse set of anchor beacons and a data collection technique, for example using as a set of PCDs to collect wireless access point data from within the environment as a background task. PCDs may then be configured to use, e.g., provided with, an environment data set, e.g., on entry of a geofenced environment, permitting the PCDs to compare newly sensed wireless access point data to the environment data set and determine location locally, without a need to connect to a server and consume associated battery power for wireless radios or subsystems.

The description now turns to the figures. The illustrated example embodiments will be best understood by reference to the figures. The following description is intended only by way of example and simply illustrates certain example embodiments.

Illustrated in FIG. 1 is a system implemented in a network environment including a communication platform server (CPS) 100 enabling a plurality of PCDs 160a-g to communicate with one another. Messages may be exchanged among the PCDs 160a-g using wireless communication, with common examples including wireless push-to-talk (PTT) communication over a logical communication channel, where a logical channel is used to group a set of available PCDs. A logical communication channel is an abstraction of the physical communication channels used, such as a Wi-Fi, cellular, or Long Range (LoRa) physical communication channel. For PCDs 160a-g, messages may be managed by software running on a server such as CPS 100, for example providing a message queue, routing messages, or dynamically configuring a PCD. In addition, certain PCDs, such as PCD 160g, may be provided in a different form factor, such as a smartphone running a mobile app to provide access and functions to connect to other PCDs 160a-f, for example using PTT over cellular or Wi-Fi. In an embodiment PCDs 160a-f may be voice interface PCDs as described herein. In another embodiment, PCDs may have limited screen functionality compared to a smartphone.

In some example embodiments, PCDs 160a-g are configured to operate within an environment 101. In an example functionality, communication outside environment 101 may be restricted, either by design or because environment 101 has limited cellular or Wi-Fi connectivity. Connectivity may be through private network devices in range of environment 101, for example Wi-Fi access point 103 and cellular access device 104 (e.g., a basestation) with coverage that includes all or a portion of environment 101, providing access to CPS 100 via a broader packet network such as the Internet via typical wireless carrier infrastructure. Note that the network provided may be private or public, or some combination thereof, using conventional networking solutions.

Figures 2, 2B:
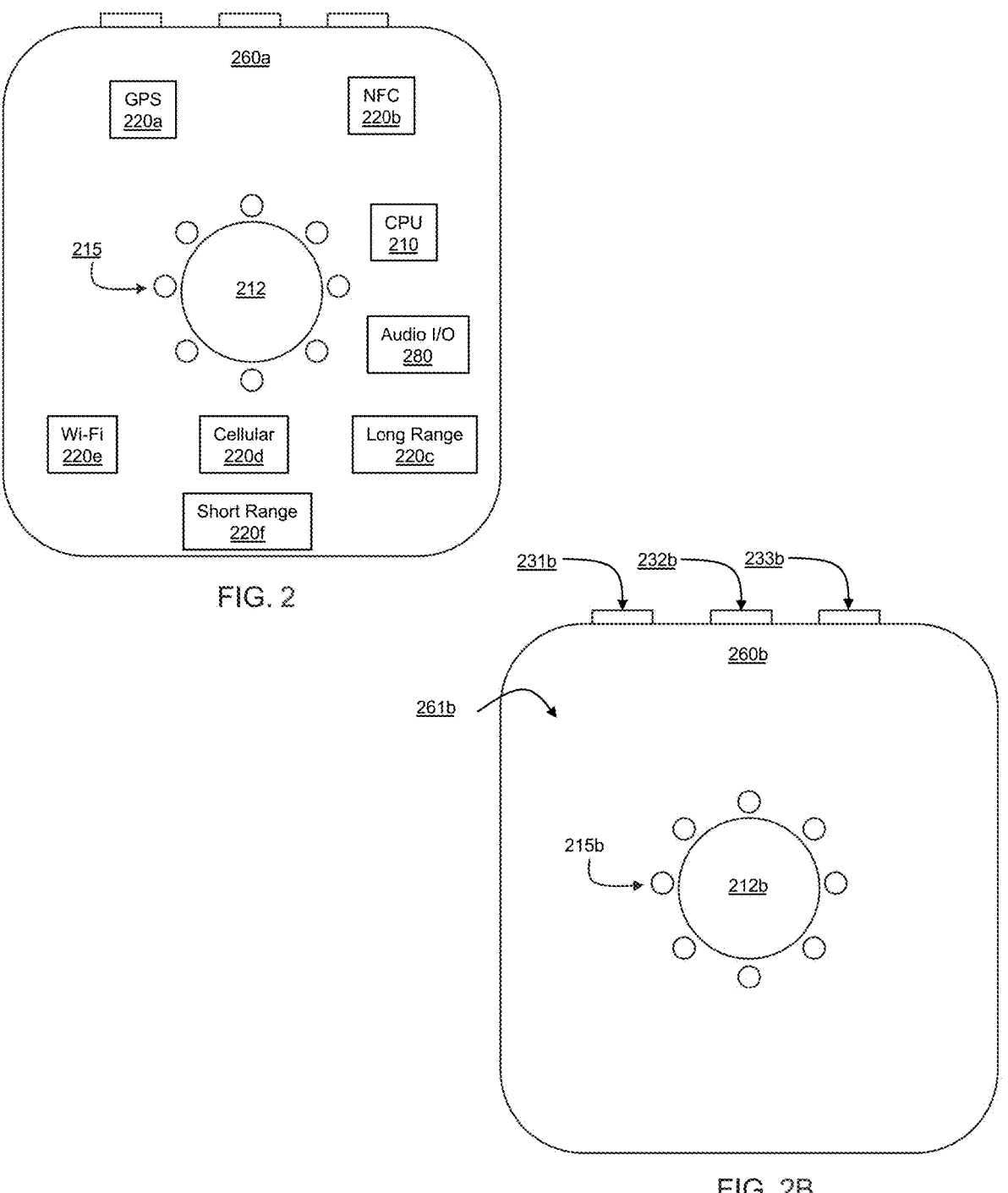
FIG. 2 illustrates an example portable communication device (PCD) and components according to an embodiment.
FIG. 2B illustrates an example PCD exterior according to an embodiment.

Referring to FIGS. 2 and 2B, in an embodiment a PCD 260a, 260b may be a voice interface PCD featuring a voice interface and limited control buttons 212, 212b such as the Relay® device. In an embodiment, PCD 260a may include one or more of several radio interfaces, including a GPS module 220a, a near field communication (NFC) device 220b, a LoRa transceiver 220c, a cellular transceiver 220d, a Wi-Fi transceiver 220e, and a short-range wireless (e.g., BLUETOOTH) transceiver 220f. Cellular transceiver 220d may comprise a radio frequency (RF) chipset configured to communicate using a plurality of wireless cellular frequency bands and protocols. Wi-Fi transceiver 220e may comprise an RF chipset configured to communicate using one or more of the 802.11 protocols commonly referred to as Wi-Fi. Short range transceiver 220f may comprise an RF chipset configured to communicate using the BLUETOOTH or other short range wireless protocol(s). Long-range transceiver 220c may comprise an RF chipset configured to communicate using yet another RF communication protocol known as LoRa. LoRa is a physical radio communication protocol ideal for long range wireless applications and long battery life. Each of PCD 260a components 220a-f, 280 may be controlled by one or more CPU 210, such as in the form of a microprocessor that communicates with the internal components using a bus (not illustrated).

The view of FIG. 2B illustrates a user's view of PCD 260b. PCD 260b includes control button 212b, which may be touched or pressed to activate a function, such as a voice interface. Indicator lights 215b, which may take the form of light emitting diodes (LEDs), may be used as an output device, for example to indicate the device state, such as powering or powered on, powering or powered off, battery level, connected/disconnected, PTT input receiver activated, message transmitted, message received, direction, etc. In the view of FIG. 2B, a surface 261b covers internal components illustrated in FIG. 2A, such as the audio I/O device 280. Surface 261b may provide openings for receiving and transmitting audio signals, for example audio input via a microphone included in audio I/O device 280 and transmitting audio output via a speaker included in audio I/O device 280.

With respect to a user interface, a control button 212, 212b and a plurality of indicator lights 215, 215b are shown. In an embodiment, the PCD 260a may include one or more physical buttons and/or rocker switches. For example, as shown in FIGS. 2 and 2B, three physical buttons 231b, 232b, and 233b may be present on the side of the PCD. It should be understood that FIGS. 2 and 2B are for illustrative purposes only and that other interface designs and/or setups may be utilized.

Figure 3:
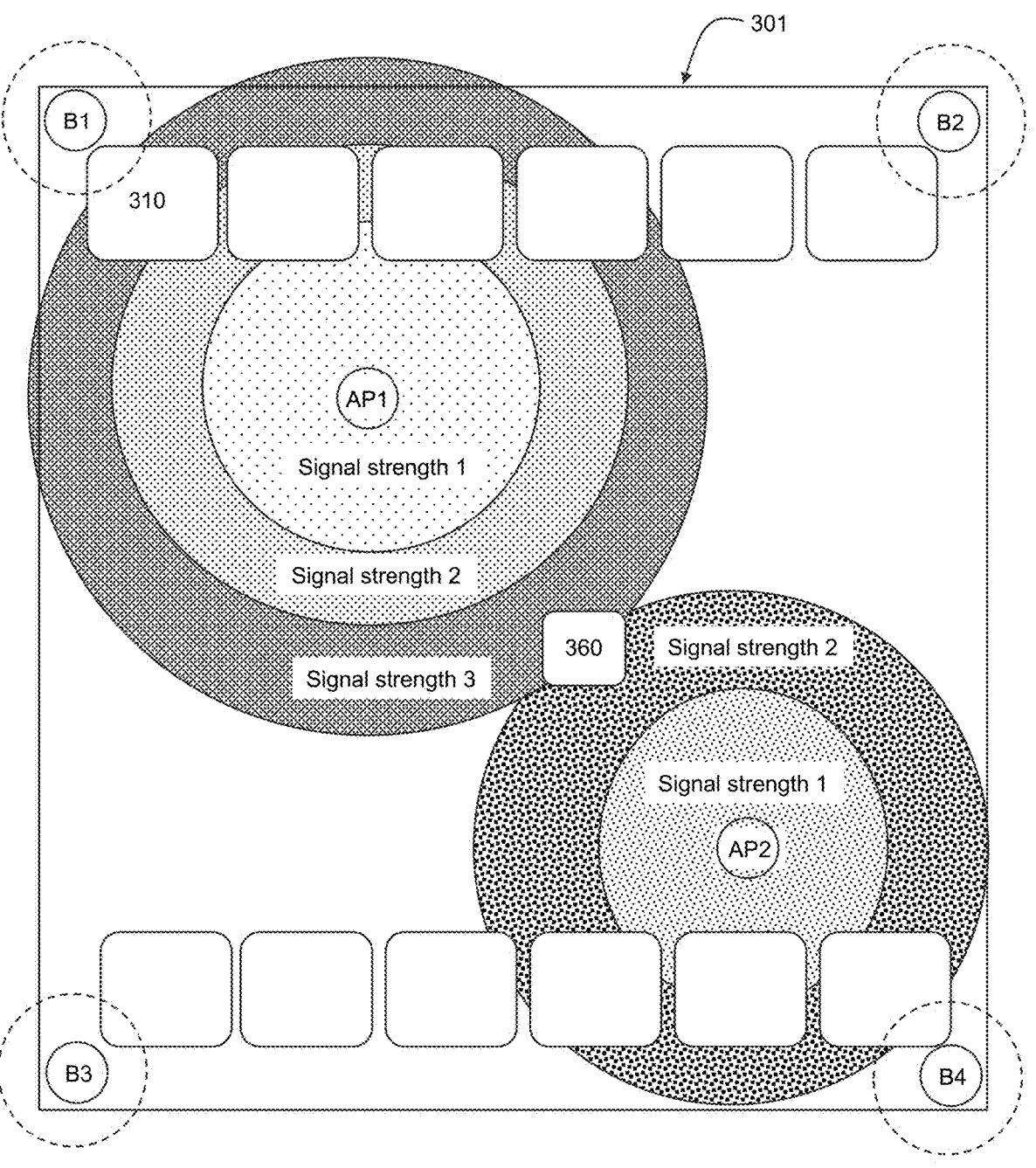
FIG. 3 illustrates an example of an environment according to an embodiment.

In terms of forming an environment dataset that can be used to accurately locate a PCD without requiring a dense set of beacons, FIG. 3 illustrates an example environment or area 301, such as a building floor, warehouse interior, or outdoor space such as a dock. Environment 301 may include structures or spaces 310 such as rooms. Environment 301 may take many shapes, sizes, and/or configurations. FIG. 3 is exemplary only and does not restrict or limit the scope of this description or claims.

In an embodiment, a service facilitated by CPS 100 gathers data and forms an environment dataset for environment 301. In an embodiment, through normal usage, each PCD, e.g., PCD 360, periodically communicates with to a multitude of devices and networks at virtually every location, indicated in the example of FIG. 3 as wireless access points AP1 and AP2 (which may represent devices generating wireless signals of any type capable of being sensed by PCD). CPS 100 stores current connectivity data (e.g., cellular carrier or access point name, signal strength, time stamp, etc.) for every PCD, e.g., PCD 360, connected to CPS 100 (even intermittently). The connectivity data collected from PCD 360 may be updated frequently, for example about every ten seconds while PCD 360 is connected to CPS 100 to perform network handoffs, e.g., switching between SIMs, such as when the connectivity between a PCD and an associated wireless access point starts degrading.

Environment dataset for environment 301 may comprise data regarding wireless connectivity in a three-dimensional space, for example using a latitude and longitude coordinate system along with an elevation component, each of which may be scaled, e.g., to reflect structures or spaces, e.g., 310, in environment 301, elevation by the floor of the building, etc. CPS 100 can associate a signal strength of every wireless access point with environment 301 to create an environment dataset.

As illustrated in FIG. 3, environment dataset comprises data indicative of wireless access points, e.g., AP1, AP2, available in sublocations or positions of environment 301 along with associated signal strengths. Additional data, such as structure or space 310, may be included in environment dataset, such as to produce a visual presentation of environment 301, but may also be omitted from data provided in environment dataset, e.g., to a PCD, or such data may be included in another format. For the purpose of illustration, environment 301 illustrates data for 2-dimensional coordinates (e.g., for a single floor of a building), although 3-D data may be provided, e.g., for multiple floors or elevations.

By way of example, environment 301 may represent a geofenced customer premises such as a floor of a building with cubicles or offices, e.g., indicated as structures or spaces 310, with data of all the wireless access points overlayed thereon. Different shadings in FIG. 3 represent different wireless access points AP1, AP2, and/or different signal strengths that may be sensed by PCD 360.

Illustrated is a sparse set of anchor beacons B1, B2, B3, and B4, offering partial wireless coverage (indicated by dashed lines) for area 301. As the location of PCD 360 changes it encounters different signal strengths potentially from different wireless access points, e.g., AP1-AP2, and anchor beacons, e.g., B1-B4. As illustrated, the set of anchor beacons is sparse because gaps in wireless coverage of environment 301 occur, which are filled at least in part by other wireless access point signals, e.g., those of AP1 and AP2. The connectivity data are reported back to CPS 100 S or like service to serve as connectivity data for generating an environment dataset.

In an embodiment, each data point for environment dataset may be comprised of four (4) essential pieces of information as in the following example:

| Data Point 1 | |
| --- | --- |
| { | |
| LOC 1: | lat-long |
| LOC 2: | floor/elevation |
| Name/ID: | AP1 |
| Signal Strength: | −40 dBm |
| } | |

In an embodiment, these data points are combined with map data that associates the locations of the sparse set of anchor beacons to the real world. Thus, an embodiment may relate the relative connectivity data to the map data, permitting location of the PCD to be determined even if not within communication range of any given anchor beacon.

An environment dataset, e.g., for environment 301, may be downloaded to each PCD, e.g., on entry of a geofenced area collocated with environment 301. Environmental dataset may contain each wireless access point historical signal strength at each sublocation within environment 301 as well as information relating to sensed positions of the sparse set of anchor beacons B1-B4. These data points allow relative wireless access point data, e.g., AP1 and AP2, to be related to real-world coordinates associated with sparse set of anchor beacons B1-B4. For example, sparse set of anchor beacons may be reported as data points by a customer or installation team as being associated with corners of environment 301, in turn associated with real world coordinates, e.g., latitude, longitude, altitude, elevation or floor.

Environment 301 may change over time in terms of applicable wireless access points, e.g., AP1 and AP2 may be complemented with additional wireless access point data as more historical data gets added, AP1 and AP2 may change names or positions, etc. This may be reflected in updates to the environment dataset. For example, environment dataset may be biased to weight newer data greater than older data using an update technique, e.g., based on timestamps included with connectivity data reports provided via PCDs. For example, in an embodiment data older than 30 days or another adjustable time threshold may be removed altogether. In an embodiment, each time a PCD is connected to the CPS over a network, PCD may download a most current environment dataset, which may include downloading data to update an existing environment dataset. In an embodiment, a PCD thereafter determines its own location (based on one or more techniques) without a need to power on its radio to communicate with an external network and device, such as a CPS.

In an embodiment a PCD may determine its location within an area, e.g., environment 301, using a variety of techniques. For example, in areas where a sparse set of anchor beacons such as B1-B4 of FIG. 3 is available, a PCD such as PCD 360 may utilize beacon data to determine its location directly when in range of a beacon, but may also, when out of signal range of sparse set of anchor beacons B1-B4, utilize AP1 and AP2 signal strengths to relate the same to real-world coordinates derived from locations of respective ones of sparse set of anchor beacons B1-B4. In an embodiment, PCD 360 may be provided with environmental dataset comprising a wireless fingerprint of environment 301 that can be used to accurately locate the PCD within environment 301 without requiring a dense set of location beacons, i.e., there is no need to have beacons offering full or substantially full coverage of environment 301 in terms of wireless signal coverage.

Referring now to FIG. 4, an example method of performing a local location determination is illustrated. In an embodiment, a method includes obtaining, using a set of one or more processors, location information relating a sparse set of anchor beacons to respective locations within an environment, as indicated at 410. For example, as illustrated in FIG. 3, a sparse set of anchor beacons B1-B4 may be recorded in a dashboard GUI as being in certain corners of a building, which is stored in association with other map data, e.g., coordinates of the building corner locations and elevation.

In an embodiment, the method may include incorporating, by the set of one or more processors, the location information relating the sparse set of anchor beacons to respective locations within the environment into an environment dataset comprising a dense set of point data obtained via one or more portable communication device (PCD), wherein each point data has a position and respective wireless signal data at that position within the environment, as indicated at 420. For example, as illustrated in FIG. 3, the locations of the sparse set of anchor beacons B1-B4 may be recorded along with real world coordinates and combined with data collected via a PCD, e.g., PCD 360 and sensed signal strengths of AP1, AP2 (noting that sparse set of anchor beacons B1-B4 may also be sensed and reported by a PCD). The relationship among sensed AP1, AP2 and any of B1-B4 permits relating relative sensing data of one or more PCDs, e.g., PCD 360, with real world coordinates derived from those associated with a sparse set of anchor beacons, e.g., B1-B4.

In an embodiment, a method includes configuring a first PCD to use the environment dataset for a local location determination process based on a comparison of newly obtained wireless signal data from one or more wireless access points in the environment to the environment dataset, indicated at 430. For example, an embodiment may send or make accessible an environment dataset to a PCD for use locally, i.e., without a need for connection with CPS 100 or other remote device. By way of specific example, on entry of an environment geofence, such as environment 301, a PCD such as PCD 360 may be provided with a current environment dataset. Thereafter, PCD may operate in a disconnected mode while still determining its location, e.g., via periodic scanning of wireless signals and related signal strengths in environment 301. This permits PCD to locate itself within an environment based on currently (newly) sensed wireless access point data, related to (e.g., compared to) the environment data. In an embodiment, the comparison may include comparing the newly sensed wireless access point data to a stored entry in the environment dataset, allowing lookup of an associated location description for use by the PCD, e.g., as output such as visible or audible output.

Thus, in an embodiment, the sparse set of anchor beacons associates respective ones of the point data to a known fixed location in a map of the environment, e.g., building floor plan data, real world coordinates, etc. For example, in an embodiment, the map of the environment comprises fixed features and their respective relationships. In an embodiment, the sparse set of anchor beacons provides partial coverage of the environment, with any gap in the partial coverage being filled via the dense set of point data, e.g., of sensed wireless access points.

In an embodiment, the position and number of the sparse set of anchor beacons are based on a shape of the environment. In an embodiment, the environment is an indoor environment. For example, the number and location of the anchor beacons may be selected based on building shape, size or area, or similar. In an embodiment, a periphery of an environment is fitted with anchor beacons.

In an embodiment, a method includes receiving, e.g., at a CPS, the newly obtained wireless signal data from one or more wireless access points in the environment, e.g., a new access point that is not included with environment dataset. As such, an embodiment may determine whether an update is appropriate, as indicated at 440. For example, if a newly added access point is sensed by a PCD, in an embodiment, a method comprises updating the environment dataset based at least in part on the newly obtained wireless signal data, indicated at 440. For example, in an embodiment, the updating comprises: receiving at a communication platform server the newly obtained wireless signal data from one or more wireless access points in the environment; and updating the environment dataset based at least in part on the newly obtained wireless signal data, which may be facilitated via reporting the newly found access point and related data (location(s), signal strength(s), name(s), etc.) to a CPS which acts to update the environment dataset. In an embodiment, a PCD may simply pass all or substantially all sensed data to a CPS or similar device, allowing CPS to determine if an update is warranted at 440.

In an embodiment, a method comprises deploying the set of anchor beacons within the environment. For example, an embodiment may provide a kit such as a predetermined number of anchor beacons in a set based on environment characteristics, as described herein, along with instructions as to placement, recording of place, etc., for example to create stored data useful in deriving real-world coordinates for an environment, as described herein.

Figure 5:
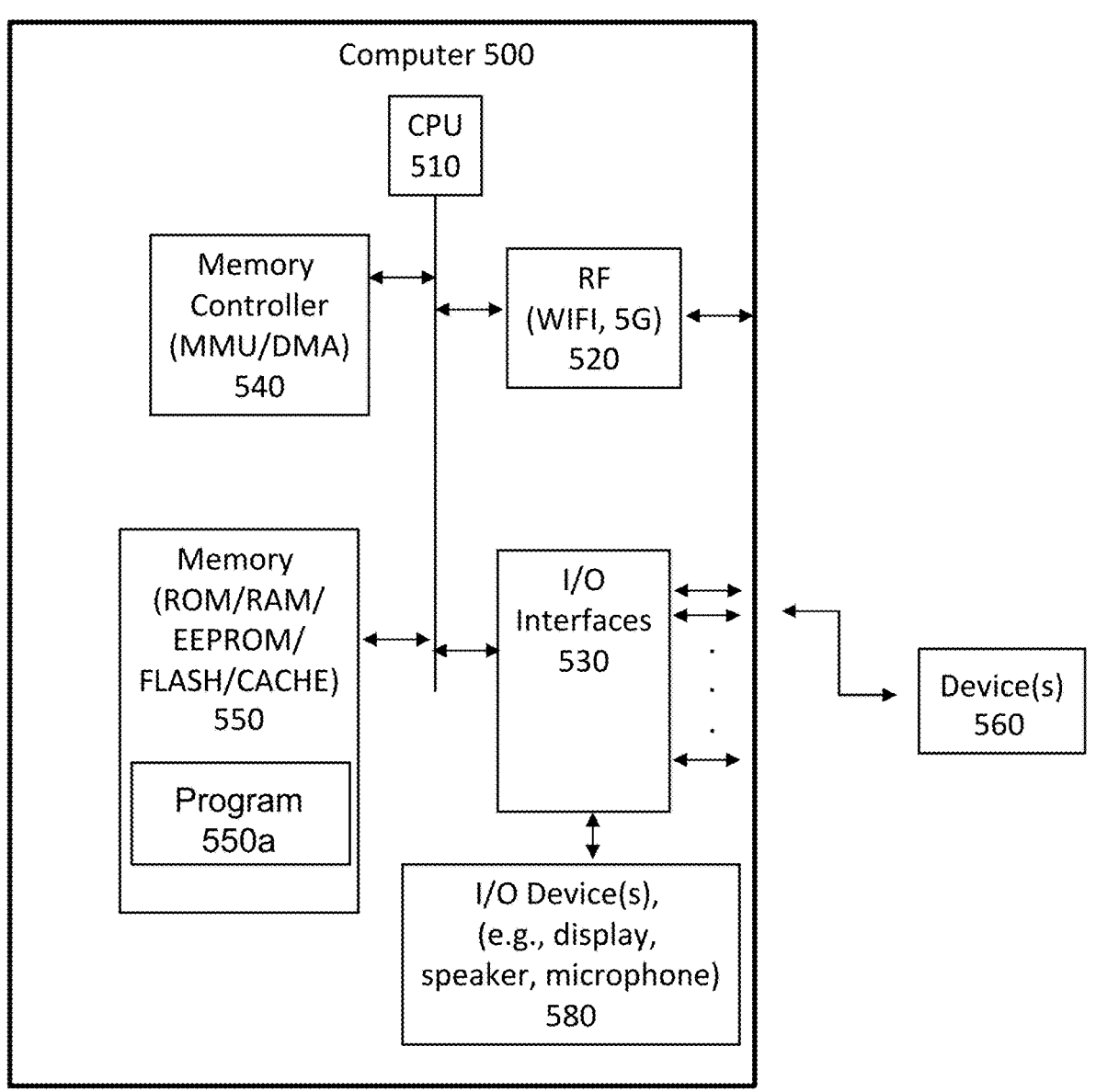
FIG. 5 illustrates an example system and components according to an embodiment.

Referring to FIG. 5, it will be readily understood that certain embodiments can be implemented using any of a wide variety of devices or combinations of devices and components. In FIG. 5 an example of a computer 500 and its components are illustrated, which may be used in a device such as CPS 100 or PCDs 160a-160g for implementing certain of the functions or acts described herein, e.g., in association with FIG. 1 through FIG. 4, embodied in program 550a, in turn implementing acts or subsets thereof. Also, circuitry other than that illustrated in FIG. 5 may be utilized in one or more embodiments. The example of FIG. 5 includes certain functional blocks, as illustrated, which may be integrated onto a single semiconductor chip to meet specific application requirements.

One or more processing units are provided, which may include a central processing unit (CPU) 510, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 510 may comprise a single integrated circuit comprising several units, the design and arrangement of which vary according to the architecture chosen.

Computer 500 also includes a memory controller 540, e.g., comprising a direct memory access (DMA) controller to transfer data between memory 550 and hardware peripherals. Memory controller 540 includes a memory management unit (MMU) that functions to handle cache control, memory protection, and virtual memory. Computer 500 may include controllers for communication using various communication protocols (e.g., I²C, USB, etc.).

Memory 550 may include a variety of memory types, volatile and nonvolatile, e.g., read only memory (ROM), random access memory (RAM), electrically erasable programmable read only memory (EEPROM), Flash memory, and cache memory. Memory 550 may include embedded programs, code, and software, e.g., program 550a, that provides coded methods such as illustrated and described in connection with FIGS. 1-4 or provides GUIs. By way of example, and not limitation, memory 550 may also include an operating system, application programs, other program modules, code, and program data, which may be downloaded, updated, or modified via remote devices.

A system bus permits communication between various components of the computer 500. I/O interfaces 530 and radio frequency (RF) devices 520, e.g., Wi-Fi and telecommunication radios, near field communication modules, etc., may be included to permit computer 500 to send data to and receive data from remote devices using wireless mechanisms, noting that data exchange interfaces for wired data exchange may be utilized. Computer 500 may operate in a networked or distributed environment using logical connections to one or more other remote computers or devices 560, for example in a system comprising a CPS and a set of PCDs. The logical connections may include a network, such local area network (LAN) or a wide area network (WAN) but may also include other networks/buses. For example, computer 500 may communicate data with and between device(s) 560.

Computer 500 may therefore execute program instructions or code configured to provide CPS and/or PCD functionality and perform other functionality of the embodiments. A user can interface with (for example, enter commands and information) the computer 500 through input devices, which may be connected to I/O interfaces 530. A display or other type of I/O device 580 may be connected to or integrated with the computer 500, for example via an interface selected from I/O interfaces 530.

It should be noted that the various functions described herein may be implemented using instructions or code stored on a memory, e.g., memory 550, that are transmitted to and executed by a processor, e.g., CPU 510. Computer 500 includes one or more storage devices that persistently store programs and other data. A storage device or computer readable medium, as used herein, is a non-transitory computer readable medium. Some examples of a non-transitory computer readable medium include, but are not limited to, storage integral to computer 500, such as memory 550, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method enabled using a set of one or more processors, the method comprising:

obtaining location information for a sparse set of anchor beacons that are physically deployed within an environment and provide only partial wireless signal coverage of the environment, each anchor beacon associated with a fixed known location within the environment;

obtaining point data from a plurality of portable communication devices (PCDs) during operation of the PCDs, the point data indicative of a current position within the environment for each of the plurality of PCDs, wherein the point data for each PCD comprises wireless signal strength data obtained from one or more wireless access points and one or more anchor beacons;

creating an environment dataset comprising by combining the point data obtained from the plurality of PCDs with the location information for the sparse set of anchor beacons, wherein the environment dataset maps physical positions within the environment to respective wireless signal strength data at each position, and anchors the mapped physical positions to real-world coordinates derived from the fixed known locations of the sparse set of anchor beacons;

determining using the environment dataset, a spatial relationship among the one or more wireless access points relative to the fixed known locations of the sparse set of anchor beacons within the environment; and configuring a first PCD to perform a local, on-device location determination without requiring connectivity to an external server, the local location determination comprising obtaining current wireless signal strength data from one or more wireless access points in the environment and comparing the current wireless signal strength data against the environment dataset stored on the first PCD to determine the position of the first PCD within the environment.

2. The method of claim 1, wherein the sparse set of anchor beacons comprise Bluetooth Low Energy (BLE) beacons.

3. The method of claim 1, wherein the sparse set of anchor beacons associates respective ones of the point data to a known location in a map of the environment.

4. The method of claim 3, wherein the map of the environment comprises fixed features that have respective relationships to one another.

5. The method of claim 1, wherein a gap in the partial wireless signal coverage is filled via the point data.

6. The method of claim 1, wherein position and number of the sparse set of anchor beacons are based on a shape of the environment.

7. The method of claim 1, wherein the environment is an indoor environment.

8. The method of claim 1, comprising:

receiving at a communication platform server the current wireless signal strength data from one or more wireless access points in the environment; and updating the environment dataset based at least in part on the current wireless signal data.

9. A system, comprising:

a set of one or more processors; and a non-transitory storage device comprising code executable by the set of one or more processors, the code configurable for:

obtaining location information for a sparse set of anchor beacons that are physically deployed within the environment and provide only partial wireless signal coverage of the environment, each anchor beacon associated with a fixed known location within an environment;

obtaining point data from a plurality of portable communication devices (PCDs) during operation of the PCDs, the point data indicative of a current position within the environment for each of the plurality of PCDs, wherein the point data for each PCD comprises wireless signal strength data obtained from one or more wireless access points and one or more anchor beacons;

creating an environment dataset comprising by combining the point data obtained from the plurality of PCDs with the location information for the sparse set of anchor beacons, wherein the environment dataset maps physical positions within the environment to respective wireless signal strength data at each position, and anchors the mapped physical positions to real-world coordinates derived from the fixed known locations of the sparse set of anchor beacons;

determining using the environment dataset, a spatial relationship among the one or more wireless access points relative to the fixed known locations of the sparse set of anchor beacons within the environment; and configuring a first PCD to perform a local, on-device location determination without requiring connectivity to an external server, the local location determination comprising obtaining current wireless signal strength data from one or more wireless access points in the environment and comparing the current wireless signal strength data against the environment dataset stored on the first PCD to determine the position of the first PCD within the environment.

10. The system of claim 9, wherein the sparse set of anchor beacons comprises Bluetooth Low Energy (BLE) beacons.

11. The system of claim 9, wherein the sparse set of anchor beacons associates respective ones of the point data to a known location in a map of the environment.

12. The system of claim 10, wherein the map of the environment comprises fixed features that have respective relationships to one another.

13. The system of claim 9, wherein a gap in the partial wireless signal coverage is filled via the point data.

14. The system of claim 9, wherein position and number of the sparse set of anchor beacons are based on a shape of the environment.

15. The system of claim 9, wherein the environment is an indoor environment.

16. The system of claim 9, wherein the code executable by the set of one or more processors is configurable for:

receiving at a communication platform server the current wireless signal strength data from one or more wireless access points in the environment; and updating the environment dataset based at least in part on the current wireless signal data.

17. The system of claim 9, wherein the configuring comprises providing the environment dataset to the first PCD.

18. A computer program product, comprising:

a non-transitory storage device comprising code executable by a set of one or more processors, the code configurable for:

obtaining location information for a sparse set of anchor beacons that are physically deployed within the environment and provide only partial wireless signal coverage of the environment, each anchor beacon associated with a fixed known location within an environment;

obtaining point data from a plurality of portable communication devices (PCDs) during operation of the PCDs, the point data indicative of a current position within the environment for each of the plurality of PCDs, wherein the point data for each PCD comprises wireless signal strength data obtained from one or more wireless access points and one or more anchor beacons;

creating an environment dataset comprising by combining the point data obtained from the plurality of PCDs with the location information for the sparse set of anchor beacons, wherein the environment dataset maps physical positions within the environment to respective wireless signal strength data at each position, and anchors the mapped physical positions to real-world coordinates derived from the fixed known locations of the sparse set of anchor beacons;

determining using the environment dataset, a spatial relationship among the one or more wireless access points relative to the fixed known locations of the sparse set of anchor beacons within the environment; and configuring a first PCD to perform a local, on-device location determination without requiring connectivity to an external server, the local location determination comprising obtaining current wireless signal strength data from one or more wireless access points in the environment and comparing the current wireless signal strength data against the environment dataset stored on the first PCD to determine the position of the first PCD within the environment.

\* \* \* \* \*